Patented Mar. 12, 1929.

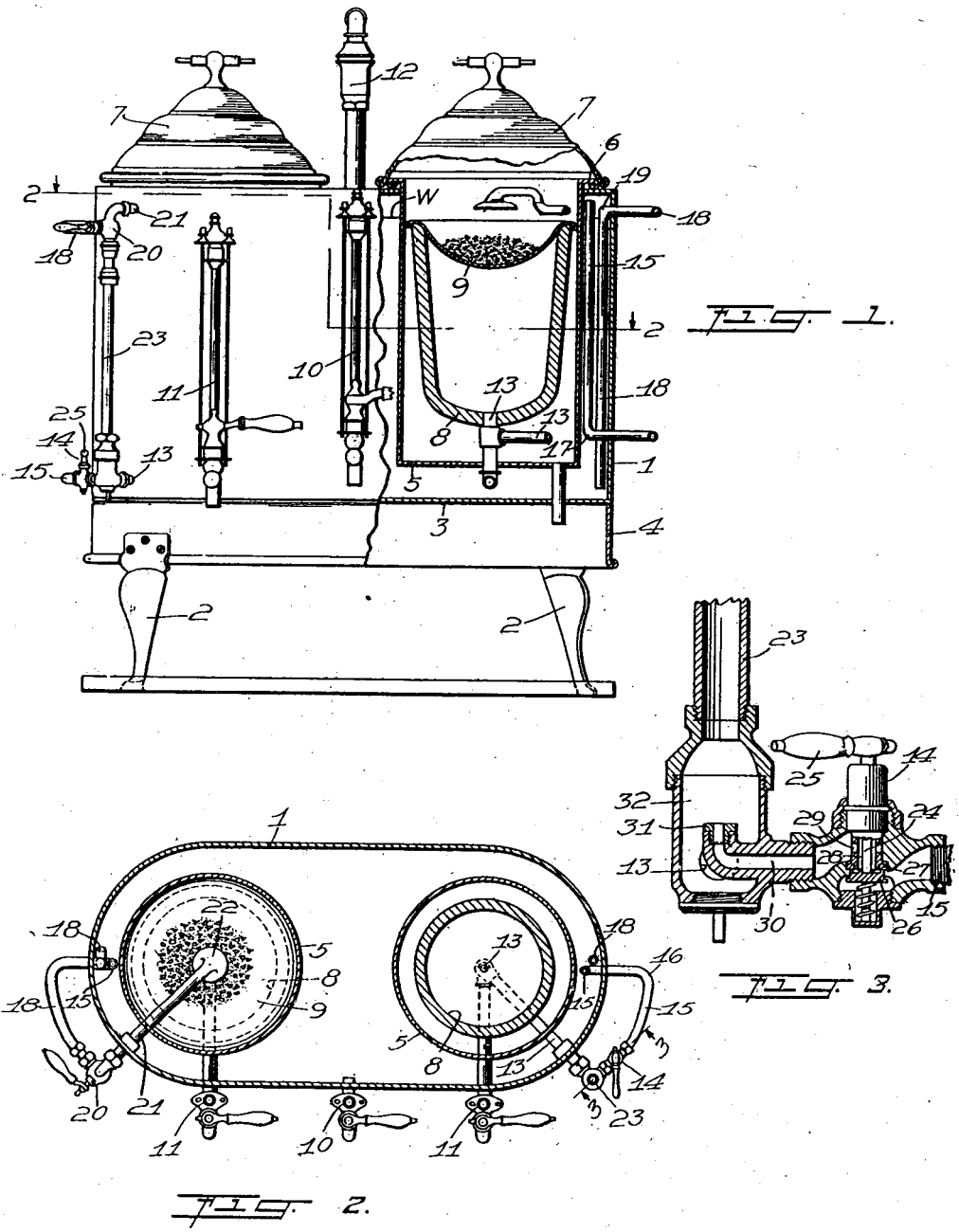

1,704,809

UNITED STATES PATENT OFFICE.

GEORGE P. PETROPULOS, OF CHICAGO, ILLINOIS.

COFFEE-MAKING APPARATUS.

Application filed October 21, 1927. Serial No. 227,756.

My invention relates to improvements in coffee making apparatus, and it consists in the combinations, constructions, and arrangements herein described and claimed.

An object of my invention is to provide a coffee making device in which the coffee liquid contained in the coffee receptacle may be caused to siphon from the receptacle through coffee grounds by merely the movement of a single valve.

A further object is to provide a coffee making apparatus in which hot water from the boiler may be siphoned from the boiler to the coffee receptacle by the means employed for circulating the coffee liquid, thereby providing a coffee making device in which the pipes and valves are reduced to a minimum.

Other objects and advantages will appear in the following specification, and the novel features of the invention will be particularly pointed out in the appended claims.

My invention is illustrated in the accompanying drawings, forming part of this application, in which Figure 1 is a front elevation, partly in section, of a device embodying my invention, Figure 2 is a sectional view taken along the line 2—2 of Figure 1, and Figure 3 is a sectional view taken along the line 3—3 of Figure 2.

In carrying out my invention, I provide a boiler 1 having legs 2 and a bottom 3. As will be seen from Figure 1, the boiler 1 is provided with an apron 4 to which the legs 2 are secured.

In the present instance, I have shown the boiler 1 as containing a pair of inner casings 5, see Figure 2. The casings 5 are open at the top end and are provided with a flange 6 arranged to bear against the top portion of the boiler 1. A cover 7 is provided for each of the inner casings 5. The covers 7 are removable so as to permit access to the interior of the inner casings 5.

A coffee receptacle 8 is disposed within each of the inner casings 5. Each of the coffee receptacles 8 is provided with a bag 9 removably disposed upon the top of the coffee receptacle 8, as shown in Figure 1.

The boiler 1 is provided with a water gauge 10. The gauge 10 is in communication with the boiler 1 and shows the amount of water within the boiler. Each of the coffee receptacles 8 is provided with a liquid gauge 11 which is in communication with the coffee receptacle for indicating the amount of coffee liquid contained in the receptacle. Any suitable safety valve 12 is provided for the boiler 1.

A pipe 13 is secured to each of the coffee receptacles 8 and communicates with the interior of the receptacles. The pipes 13 pass through the boiler 1, as shown in Figure 2, and are provided with valves 14. A pipe 15 is secured to each of the valves 14 and is bent at 16 and passed through the end of the boiler 1, as shown in Figure 2. The pipes 15 are bent at 17, as shown in Figure 1, and extend upwardly substantially to the top of the boiler 1. Pipes 18 are disposed within the boiler 1 and are bent at 19 and passed through the boiler 1 as shown in Figure 1. These pipes are provided with valves 20 and pipes 21 which pass through the boiler above the coffee receptacles 8 and are provided with nozzles 22, such as those shown in Figures 1 and 2. Pipes 23 connect the valves 20 with the valves 14, see Figure 1.

Referring to Figure 3, it will be seen that the valves 14 are provided with a plunger 24 which, upon the movement of a handle 25, may be moved to press a valve 26 out of engagement with its valve seat 27. When the valve 26 is moved away from the valve seat 27, steam passing through the pipes 15 enters a passageway 28, whereby the steam is free to pass through openings 29. After steam has passed through the openings 29, it is free to pass through a passageway 30 in a nozzle 31. The nozzle 31 with which each of the valves 14 is provided is positioned so that the passageway 30 is in longitudinal alignment with its companion pipe 23. The nozzles 31 are disposed within chambers 32. As will be seen from Figure 3, the pipes 13 are in communication with the chambers 32.

From the foregoing description of the various parts of the device, the operation thereof may be readily understood. In making coffee, the bags 9 containing the coffee grounds are placed in the top of the receptacles 8. Normally, the water within the boiler 1 is at a level indicated by a line W, and normally the space between the water level W and the top of the boiler serves as a steam chamber. After the bags 9 have been placed in position and it is desired to make coffee, the valves 20 are moved so as to place the pipes 18 in communication with the pipes 21, at which time movement of the valves 14 will permit steam to pass through the pipes 21, thereby siphoning the hot water from the boiler 1 through the nozzles 22 and into the coffee grounds carried by the coffee bags 9, and finally into the coffee receptacles 8. When the desired amount of hot water has been conveyed to either one of the coffee receptacles 8, the valve 14 is released so as to permit the valve member 26 to cut off passage of steam.

When it is necessary to make the coffee in either one of the receptacles 8 stronger, one of the valves 20 is moved so as to bring the pipe 21 in communication with the pipe 23 and cutting off the pipe 18. The valve 14 is then moved so as to permit steam to pass into the chamber 32, at which time the coffee liquid will be caused to pass through the pipe 23, through the pipe 21, the nozzle 22, and back into the coffee receptacle.

As will be seen from Figure 1, those portions of the pipes 15 which are disposed within the boiler 1 extend upwardly so as to be above the water level W.

It will be seen that I have provided a device which is relatively simple and in which the number of valves and the pipes have been reduced to a minimum.

I claim:

1. A device of the type described comprising a boiler, a coffee making receptacle disposed within the boiler, a feed pipe disposed within the boiler and having one end terminating near the bottom of the latter, a steam pipe disposed within the boiler and having one end terminating relatively near the upper end of the boiler, a second steam pipe, said feed pipe being operatively connected with said second steam pipe, said steam pipe being operatively connected with said second steam pipe, a nozzle disposed above said coffee making receptacle and being operatively connected with said second steam pipe, a pipe connecting the lower part of the coffee making receptacle and said second steam pipe, and valve means for permitting steam to be circulated through said second steam pipe, whereby water may be conveyed from the boiler to the coffee making receptacle through said nozzle or the liquid coffee within the coffee making receptacle circulated through said second steam pipe and the nozzle back to the coffee making receptacle.

2. A device of the type described comprising a boiler, a coffee making receptacle disposed within the boiler, a feed pipe disposed within the boiler and having one end terminating near the bottom of the latter, a steam pipe disposed within the boiler and having one end terminating relatively near the upper end of the boiler, a second steam pipe, said feed pipe being operatively connected with said second steam pipe, said steam pipe being operatively connected with said second steam pipe, a valve disposed at the junction of the feed pipe and the second steam pipe, a nozzle disposed above said coffee making receptacle and being operatively connected with said valve, a pipe having one end in communication with the interior of said coffee making receptacle and the other end operatively connected with said second steam pipe, and a valve disposed near the junction of the steam pipe and the second steam pipe for directing steam through said second steam pipe, whereby water when in the boiler may be passed into the coffee making receptacle through the nozzle when said first named valve is disposed in a predetermined position and for circulating the liquid coffee within the coffee making receptacle through the second steam pipe and the nozzle back to the coffee making receptacle when said first named valve is disposed in a different position.

Signed at Chicago, in the county of Cook and State of Illinois, this 14th day of October, A. D. 1927.

GEORGE P. PETROPULOS.